US009786035B2

United States Patent
Nakano

(10) Patent No.: US 9,786,035 B2
(45) Date of Patent: Oct. 10, 2017

(54) IMAGE PROCESSING APPARATUS AND IMAGE PROCESSING METHOD FOR PERFORMING INTERLACED TO PROGRESSIVE CONVERSION

(71) Applicant: SAMSUNG DISPLAY CO., LTD., Yongin-si, Gyeonggi-Do (KR)

(72) Inventor: Takashi Nakano, Yokohama (JP)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 48 days.

(21) Appl. No.: 14/925,640

(22) Filed: Oct. 28, 2015

(65) Prior Publication Data
US 2016/0132998 A1 May 12, 2016

(30) Foreign Application Priority Data
Nov. 10, 2014 (JP) ................................ 2014-228300

(51) Int. Cl.
G06K 9/40 (2006.01)
G06T 3/40 (2006.01)
H04N 7/01 (2006.01)

(52) U.S. Cl.
CPC ............ *G06T 3/4007* (2013.01); *G06T 3/403* (2013.01); *H04N 7/012* (2013.01)

(58) Field of Classification Search
None
See application file for complete search history.

(56) References Cited

U.S. PATENT DOCUMENTS

| | | | |
|---|---|---|---|
| 5,991,463 A | 11/1999 | Greggain et al. | |
| 7,154,556 B1 * | 12/2006 | Wang | H04N 7/012 348/448 |
| 7,349,028 B2 * | 3/2008 | Neuman | H04N 7/012 348/448 |
| 7,379,626 B2 * | 5/2008 | Lachine | G06T 3/403 345/611 |
| 7,412,096 B2 * | 8/2008 | Neuman | H04N 7/012 348/448 |

(Continued)

FOREIGN PATENT DOCUMENTS

| | | |
|---|---|---|
| EP | 1662771 A2 | 5/2006 |
| JP | 2001-094951 | 4/2001 |

(Continued)

OTHER PUBLICATIONS

Lachine et al., "Edge adaptive intra field de-interlacing of video images", Proc. SPIE 8666, Visual Information Processing and Communication IV, 86660A (Feb. 21, 2013); doi:10.1117/12.2010390.*

(Continued)

*Primary Examiner* — Feng Niu
(74) *Attorney, Agent, or Firm* — F. Chau & Associates, LLC

(57) ABSTRACT

Provided is an image processing apparatus including a preprocessor configured to determine, based on an input image signal being input, a calculation range of calculation of detecting a direction of an edge in an image which the input image signal represents; and an edge direction detection unit configured to perform calculation within the calculation range determined based on the input image signal and detect the direction of the edge.

20 Claims, 9 Drawing Sheets

(56) References Cited

U.S. PATENT DOCUMENTS

| | | | | |
|---|---|---|---|---|
| 7,515,205 | B1* | 4/2009 | Wang | H04N 7/012 348/448 |
| 7,693,342 | B2* | 4/2010 | Poon | H04N 5/23248 348/208.6 |
| 7,880,809 | B2* | 2/2011 | Neuman | H04N 7/012 348/448 |
| 8,340,473 | B2* | 12/2012 | Lim | G06T 3/40 382/195 |
| 9,288,363 | B2* | 3/2016 | Takashima | H04N 5/142 |
| 2005/0168633 | A1* | 8/2005 | Neuman | H04N 7/012 348/448 |
| 2005/0168657 | A1* | 8/2005 | Neuman | H04N 7/012 348/700 |
| 2006/0039590 | A1* | 2/2006 | Lachine | G06T 3/403 382/128 |
| 2006/0115184 | A1* | 6/2006 | Michel | G06T 3/403 382/299 |
| 2006/0159364 | A1* | 7/2006 | Poon | H04N 5/23248 382/275 |
| 2008/0129863 | A1* | 6/2008 | Neuman | H04N 7/012 348/448 |
| 2010/0074558 | A1* | 3/2010 | Lim | G06T 3/40 382/300 |
| 2015/0288851 | A1* | 10/2015 | Takashima | H04N 5/142 382/298 |

FOREIGN PATENT DOCUMENTS

| | | |
|---|---|---|
| JP | 2012506646 | 3/2012 |
| JP | 2013-219490 | 10/2013 |
| JP | 2014-085892 | 5/2014 |
| JP | 2014-093644 | 5/2014 |
| KR | 1020100033712 | 3/2010 |

OTHER PUBLICATIONS

Shigeru Ando, "Numerical Differentiation Operators Without Self-Inconsistency," Automatic Control Instrumentation Society Paper Collection, vol. 40, No. 11, pp. 1-22, 2001 (English Version).

Shigeru Ando, "Numerical Differentiation Operators Without Self-Inconsistency," Automatic Control Instrumentation Society Paper Collection, vol. 40, No. 11, pp. 1-22, 2001 (Original Version).

Hiroto Masuda, et al., "Directional Adaptive Picture Enlarging Using Twelve Directional Operators," The Institute of Electronics, Information and Communication Engineers, IEICE Technical Report, IMQ2011-11 (Sep. 2011) pp. 19-22.

* cited by examiner

FIG. 3

| Result of Quadadrant Determination | | Result of Edge Direction Determination (Result of First Determination) | | | | |
|---|---|---|---|---|---|---|
| | | No Edge | Vertical Direction | Horizontal Direction | Exception |
| | 0 ~ 90° | No Direction | 0, 45 ~ 90° | 0, 45, 90° | 0, 45, 90° |
| | 90 ~ 180° | No Direction | 0, 90 ~ 135° | 90, 135 ~ 180° | 90, 135, 135° |
| No Direction | | No Direction | No Direction | No Direction | No Direction |

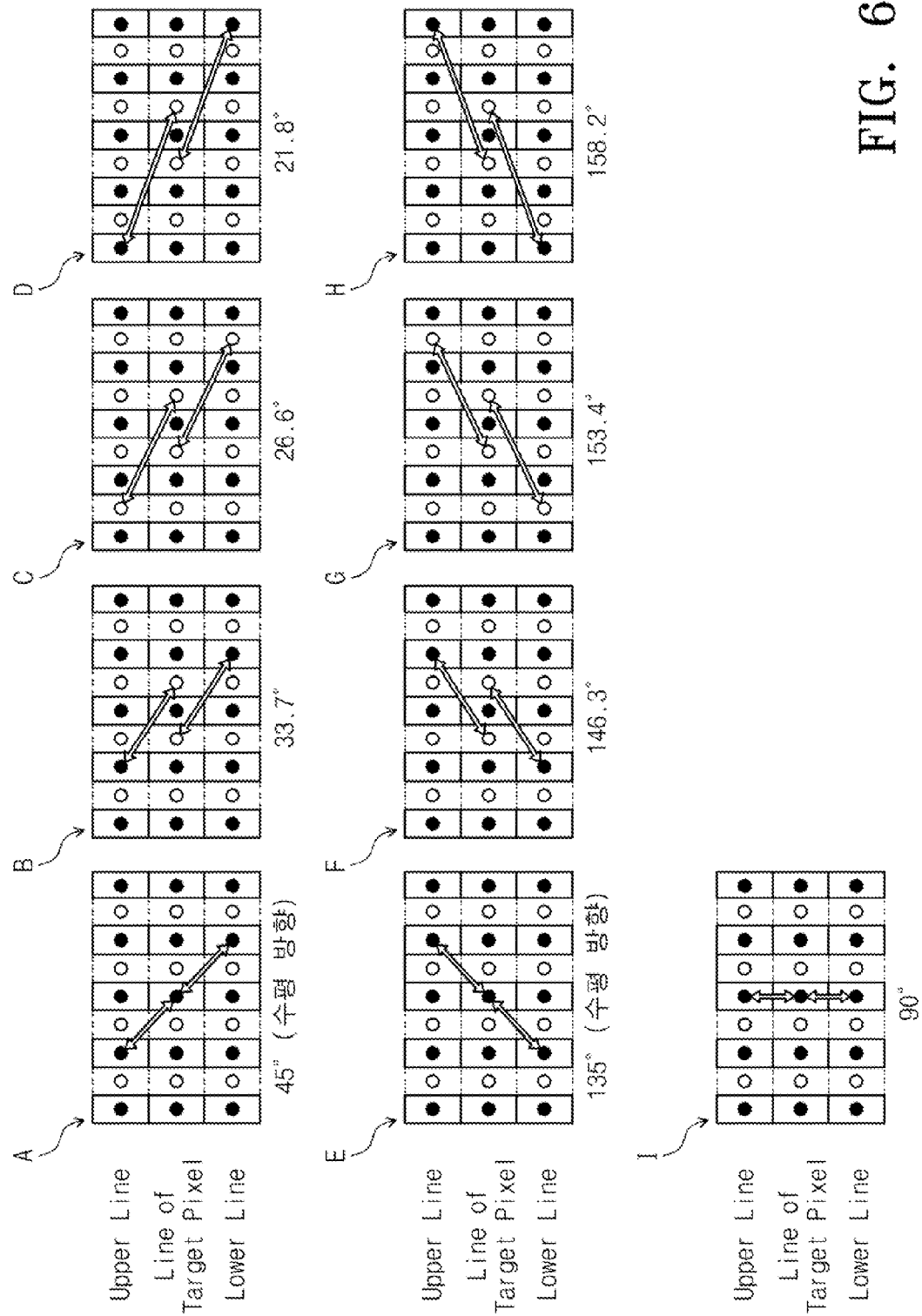

45°
(Horizontal Direction)

45°
(Vertical Direction)

IMAGE PROCESSING APPARATUS AND IMAGE PROCESSING METHOD FOR PERFORMING INTERLACED TO PROGRESSIVE CONVERSION

CROSS-REFERENCE TO RELATED APPLICATIONS

This U.S. non-provisional patent application claims priority under 35 U.S.C. §119 from, and the benefit of, Japanese Patent Application No. JP2014-228300, filed on Nov. 10, 2014, the contents of which are herein incorporated by reference in their entirety.

BACKGROUND

Embodiments of the present disclosure are directed to an image processing apparatus and an image processing method.

To convert an interlaced image into a progressive image, referred to hereinbelow as IP conversion, direction adaptive interpolation, also known as edge-directed interpolation, can be used to decrease jagged diagonal lines. In addition, with the development of high precision display devices, the importance of magnification processing to magnify an image has increased, which can magnify the jagged diagonal lines.

Technologies to detect an edge direction in an image based on an image signal have been developed.

When interlaced to progressive (IP) conversion is performed, it is desirable to detect a diagonal direction close to the horizontal direction of an image. When both the vertical and horizontal directions of the image are also magnified, it is desirable to detect a diagonal direction close to the vertical direction. However, the operational cost for detecting edge directions for magnification is at least twice that of a general IP conversion.

A differential operator uses a pixel array, such as a 3×3 or a 5×5 pixel array, around a target pixel. However, this operator may not have sufficient precision to detect an edge direction when the direction of the edge is detected using only the output of a differential operator.

More particularly, when a differential operator uses, e.g., a 3×3 pixel array around a target pixel, the angle of a diagonal line close to the horizontal or vertical direction of an image may not be detected with high precision. In addition, when a differential operator uses, e.g., a 5×5 pixel array around the target pixel, detection precision of the edge direction may be enhanced with respect to a 3×3 pixel array, but there may not be sufficient detecting precision due to surrounding influence when there is a small texture around a thin line in the image.

In addition, when the edge direction is detected using only, e.g., the output of a differential operator, a single direction is detected even when two edges cross each other, e.g., at the peak of a polygon in an image. That is, when the direction of the edge is detected using only the output of a differential operator, the edge direction may be erroneous.

SUMMARY

Embodiments of the inventive concept can provide a novel and improved image processing apparatus, method, and program that may reduce operation costs for detecting an edge direction and enhance the detecting precision of the edge direction.

Embodiments of the present disclosure can provide an image processing apparatus and method.

An embodiment of the inventive concept provides an image processing apparatus includes a preprocessor that determines, based on an input image, a calculation range of a calculation which detects an edge direction in the input image; and an edge direction detection unit that performs the calculation within the calculation range determined based on the input image to detect the edge direction, wherein the preprocessor determines the calculation range based on a result of a first determination that determines whether the edge direction is closer to a horizontal direction of the image or closer to a vertical direction of the image, and a result of a second determination that determines a quadrant to which the edge direction belongs.

In an embodiment, the preprocessor may include an edge direction determination unit that performs the first determination based on the input image; a quadrant determination unit that performs the second determination based on the input image; and a calculation range determination unit that determines the calculation range based on the result of the first determination and the result of the second determination.

In an embodiment, the edge direction determination unit may perform the first determination on each target pixel based on a result of a first filter that detects whether an edge at the target pixel is closer to a horizontal direction than a vertical direction of an image and a result of a second filter that detects whether an edge at the target pixel is closer to a vertical direction than a horizontal direction of an image.

In an embodiment, the result of the first filter at the location of the target pixel may be a greater of an absolute value of an output of a filter that detects a horizontal edge of a upper side at the target pixel and an absolute value of an output of a filter that detects a horizontal edge at a lower side of the target pixel.

In an embodiment, the result of the first filter at the location of the target pixel may be a greatest of an absolute value of an output of a filter that detects a horizontal edge at an upper side of the target pixel, an absolute value of an output of a filter that detects a horizontal edge at a lower side of the target pixel, an absolute value of an output of a filter that detects a diagonal edge closer to the horizontal direction than a vertical direction at the upper side of the target pixel, and an absolute value of an output of a filter that detects a diagonal edge closer to the horizontal direction than a vertical direction at the lower side of the target pixel.

In an embodiment, the result of the second filter at the location of the target pixel may be a greater of an absolute value of an output of a filter that detects a vertical edge at a left side of the target pixel and an absolute value of an output of a filter that detects a vertical edge at a right side of the target pixel.

In an embodiment, the result of the second filter at the location of the target pixel may be a greatest of an absolute value of an output of a filter that detects a vertical edge at a left side of the target pixel, an absolute value of an output of a filter that detects a vertical edge at a right side of the target pixel, an absolute value of an output of a filter that detects a diagonal edge closer to the vertical direction than a horizontal direction at the left side of the target pixel, and an absolute value of an output of a filter that detects a diagonal edge closer to the vertical direction than a horizontal direction at the right side of the target pixel.

In an embodiment, the edge direction determination unit may determine that there is no edge when the result of the first filter at the location of the target pixel is less than or equal to a predetermined threshold value and the result of the second filter at the location of the target pixel is less than or equal to the threshold value.

In an embodiment, the quadrant determination unit may use a differential operator to perform the second determination.

Another embodiment of the inventive concept provides an image processing method that includes determining a calculation range of a calculation that detects an edge direction in an input image; and performing the calculation within the calculation range to detect the edge direction, wherein determining a calculation range includes determining whether the edge direction in the image is closer to a horizontal direction of the image or closer to a vertical direction of the image, determining a quadrant to which the edge direction belongs, and determining the calculation range based on the edge direction and the quadrant to which the edge direction belongs.

In an embodiment, determining whether the edge direction in the image is closer to a horizontal direction of the image or closer to a vertical direction of the image may include detecting, with a first filter, whether an edge at the target pixel is closer to a horizontal direction than a vertical direction of an image, and detecting, with a second filter, whether an edge at the target pixel is closer to the vertical direction than the horizontal direction of an image.

In an embodiment, a result of the first filter at the location of the target pixel may be a greater of an absolute value of an output of a filter that detects a horizontal edge at a upper side of the target pixel and an absolute value of an output of a filter that detects a horizontal edge at a lower side of the target pixel.

In an embodiment, the result of the first filter at the location of the target pixel may be a greatest of an absolute value of an output of a filter that detects a horizontal edge at an upper side of the target pixel, an absolute value of an output of a filter that detects a horizontal edge at a lower side of the target pixel, an absolute value of an output of a filter that detects a diagonal edge closer to the horizontal direction than the vertical direction at the upper side of the target pixel, and an absolute value of an output of a filter that detects a diagonal edge closer to the horizontal direction than the vertical direction at the lower side of the target pixel.

In an embodiment, the result of the second filter at the location of the target pixel may be a greater of an absolute value of an output of a filter that detects a vertical edge at a left side of the target pixel and an absolute value of an output of a filter that detects a vertical edge at a right side of the target pixel.

In an embodiment, the result of the second filter at the location of the target pixel may be a greatest of an absolute value of an output of a filter that detects a vertical edge at a left side of the target pixel, an absolute value of an output of a filter that detects a vertical edge at a right side of the target pixel, an absolute value of an output of a filter that detects a diagonal edge closer to the vertical direction than the horizontal direction at the left side of the target pixel, and an absolute value of an output of a filter that detects a diagonal edge closer to the vertical direction than the horizontal direction at the right side of the target pixel.

In an embodiment, the method may include determining that there is no edge when the result of the first filter at the location of the target pixel is less than or equal to a predetermined threshold value and the result of the second filter at the location of the target pixel is less than or equal to the threshold value.

In an embodiment, determining a quadrant to which the edge direction belongs may include calculating a result fGV of a first differential filter at the location of a target pixel; calculating a result fGH of a second differential filter at the location of the target pixel; calculating a first sum $P0=\Sigma_{k=-1}^{1}\Sigma_{l=-1}^{1}G0_{k,l}$ and a second sum $P1=\Sigma_{k=-1}^{1}\Sigma_{l=-1}^{1}G1_{k,l}$, wherein $$G0 = \begin{cases} 0 & \text{if } S \neq -1 \\ |fGV|+|fGH| & \text{if } S = -1 \end{cases},$$

$$G1 = \begin{cases} 0 & \text{if } S = -1 \\ |fGV|+|fGH| & \text{if } S \neq -1 \end{cases},$$

and S=sgn(fGV×fGH), determining that the edge direction belongs to a 0° to 90° quadrant if P0>αP1, determining that the edge direction belongs to a 90° to 180° quadrant if P1>αP0, and determining that the edge direction is uncertain, if neither $P0_j>\alpha \cdot P1_j$ nor $P1_j>\alpha \cdot P0_j$ is satisfied, wherein α is a parameter experimentally obtained from a sample image.

Another embodiment of the inventive concept provides an image processing apparatus that includes a preprocessor that determines, based on an input image, a calculation range of a calculation which detects an edge direction in the input image, wherein the preprocessor determines the calculation range based on a result of a first determination that determines whether the edge direction is closer to a horizontal direction of the image or closer to a vertical direction of the image and a result of a second determination that determines a quadrant to which the edge direction belongs, wherein the preprocessor includes an edge direction determination unit that performs the first determination based on the input image; a quadrant determination unit that performs the second determination based on the input image; and a calculation range determination unit that determines the calculation range based on the result of the first determination and the result of the second determination.

In an embodiment, the apparatus may include an edge direction detection unit that performs the calculation within the calculation range determined based on the input image to detect the edge direction.

In an embodiment, the edge direction determination unit performs the first determination on each target pixel based on a result of a first filter that detects whether an edge at the target pixel is closer to a horizontal direction than a vertical direction of an image, and a result of a second filter that detects whether an edge at the target pixel is closer to the vertical direction than the horizontal direction of an image.

BRIEF DESCRIPTION OF THE FIGURES

FIG. 3 illustrates an image processing method according to an embodiment of the inventive concept.

FIG. 6 illustrates an example of processing by a matching unit in an image processing apparatus according to an embodiment of the inventive concept.

DETAILED DESCRIPTION

Figure 1:
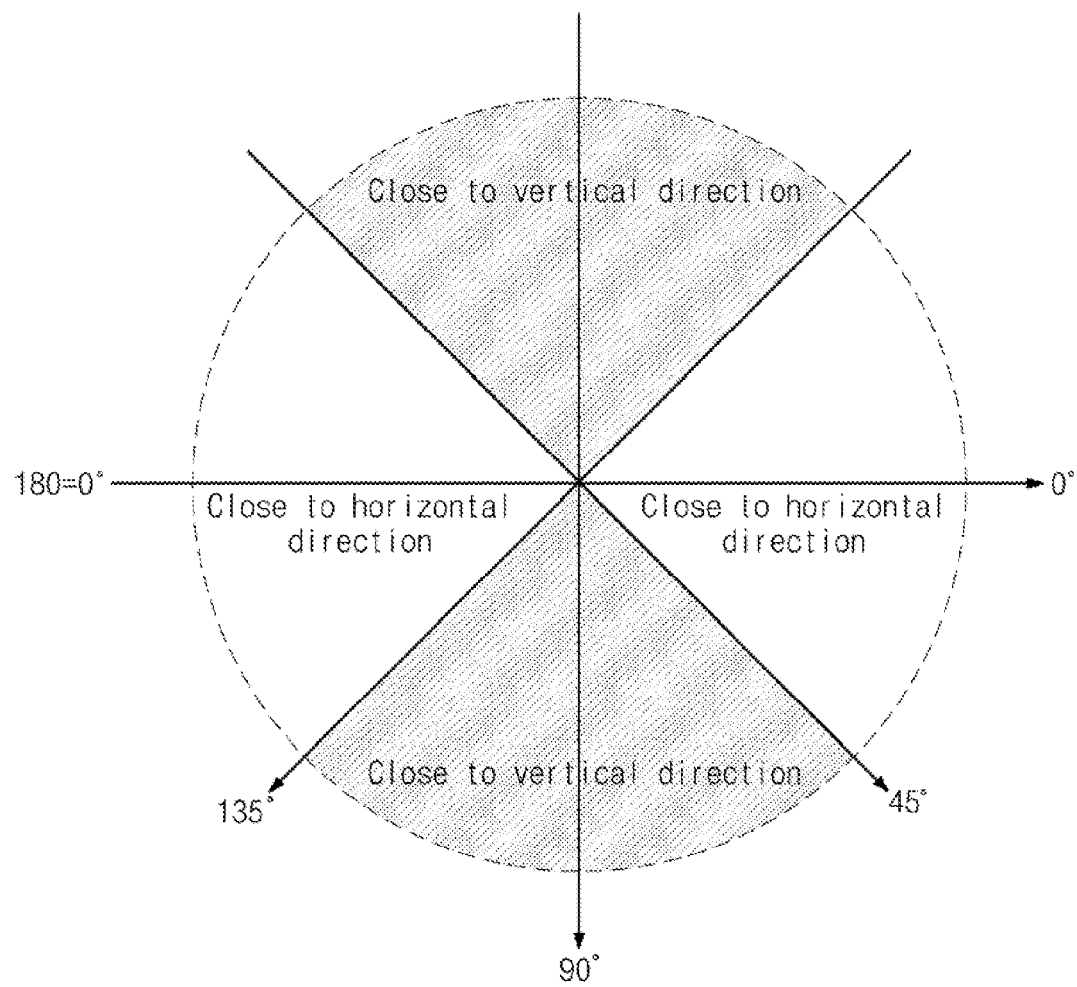
FIG. 1 illustrates an image processing method according to an embodiment of the inventive concept.

Exemplary embodiments of the inventive concept will be described below in more detail with reference to the accompanying drawings. The inventive concept may, however, be embodied in different forms and should not be construed as limited to the embodiments set forth herein.

In the drawings, components having substantially the same functions may be denoted by like numerals in the present disclosure and accompanying drawings and thus repetitive descriptions may be omitted.

I. Image Processing Method According to Embodiment of Inventive Concept

Firstly, an image processing method according to an embodiment of the inventive concept is described. In the following, image processing according to a method according to an embodiment of the inventive concept is described with an example in which the processing is performed by an image processing apparatus according to an embodiment of the inventive concept.

[1] Overview of Image Processing Method According to Embodiment of Inventive Concept As described above, detection precision of an edge direction may not be enhanced, which can decrease an operating cost of detecting an edge direction.

In this example, an image processing apparatus according to an embodiment of the inventive concept can preprocess an input image signal to determine a calculation range for detecting an edge direction in an image represented by the input image signal. In the following, the image represented by the input image signal is referred to as the "input image".

In this example, the input image processed by an image processing apparatus according to an embodiment of the inventive concept may include an image represented by image data that is read from, e.g., an external recording medium connected to an image processing apparatus according to an embodiment of the inventive concept. In addition, the input image processed by an image processing apparatus according to an embodiment of the inventive concept may also include an image represented by an image signal received from an external device by a communication device of an image processing apparatus according to an embodiment of the inventive concept, or an image represented by an image signal received by an external communication device connected to an image processing device according to an embodiment of the inventive concept.

In addition, an image processing apparatus according to an embodiment of the inventive concept performs, based on the input image signal, calculations within the calculation range to detect the edge direction.

Calculations performed by an image processing apparatus according to an embodiment of the inventive concept for detecting an edge direction may include, e.g., block matching. When the calculation for detecting an edge direction includes block matching, the calculation range corresponds to a search range in the matching.

However, calculations performed by an image processing apparatus according to an embodiment of the inventive concept for detecting an edge direction are not limited thereto. For example, an image processing apparatus according to an embodiment of the inventive concept may detect the edge direction with higher precision, and may also perform other calculations within the calculation range determined in the preprocessing.

An image processing apparatus according to an embodiment of the inventive concept performs processing according to an image processing method according to an embodiment of the inventive concept, e.g., the preprocessing and the edge direction detection.

[2] Processing According to an Image Processing Method According to an Embodiment of Inventive Concept Subsequently, an image processing method according to an embodiment of the inventive concept is described in more detail.

[2-1] Definition of a Spatial Filter Denotation Method

In the following, processing according to an image processing method according to an embodiment of the inventive concept is described using a spatial filter. Thus, a spatial filter denotation method is defined before describing an image processing method according to an embodiment of the inventive concept.

In the following, a spatial filter according to an embodiment of the inventive concept is, e.g., a 3×3 spatial filter. However, embodiments of the inventive concept are not limited thereto. For example, a spatial filter according to an embodiment of the inventive concept may also be a 5×5 spatial filter.

The vertical coordinate of a pixel to be processed, hereinafter, referred to as a "target pixel", in an image, is denoted by "i", the horizontal coordinate thereof is denoted by "j", and the pixel value of the target pixel is denoted by "xij". In this example, a pixel value according to an embodiment of the inventive concept may include, e.g., a luminance value.

When a filter coefficient for the pixel value xij is "$a_{0,0}$", the coefficient matrix of a 3×3 spatial filter is represented by, e.g., Equation (1) below.

$$A = \begin{bmatrix} a_{-1,-1} & a_{-1,0} & a_{-1,1} \\ a_{0,-1} & a_{0,0} & a_{0,1} \\ a_{1,-1} & a_{1,0} & a_{1,1} \end{bmatrix}. \tag{1}$$

Let the output of a 3×3 spatial filter at the location of the target pixel be represented by "$fA_{i,j}$"; then the output of the spatial filter can be calculated by Equation (2) below:

$$fA_{i,j} = \sum_{k=-1}^{1} \sum_{l=-1}^{1} x_{i+k,j+l} \cdot a_{k,l}. \tag{2}$$

[2-2] Processing According to an Image Processing Method According to an Embodiment of Inventive Concept (1) Preprocessing An image processing apparatus according to an embodiment of the inventive concept can determine the calculation range for detecting an edge direction in an input image, based on an input image.

An image processing apparatus according to an embodiment of the inventive concept can determine a calculation range in section (1-3), below, based on a result of determining an edge direction in section (1-1), below and determining a quadrant in section (1-2), below.

(1-1) Edge Direction Determination (First Determination)

An image processing apparatus according to an embodiment of the inventive concept can determines whether an edge direction in an input image is closer to the horizontal direction or closer to the vertical direction. In the following, the determination of an edge direction may be referred to as a "first determination".

FIG. 1 illustrates an image processing method according to an embodiment of the inventive concept and in particular, an example of determining an edge direction by an image processing apparatus according to an embodiment of the inventive concept.

In FIG. 1, the horizontal direction of an image is 0°, the vertical direction of the image may be 90°, and the direction of the edge is expressed by an angle.

In FIG. 1, an edge whose direction is closer to the horizontal direction of the image will have an angle in the range of about "0°≤direction of edge<45°, or about 135°<direction of edge≤180°". In addition, an edge whose direction is closer to the vertical direction of the image will have an angle in the range of about "45°<direction of edge≤90°, or 90°≤direction of edge<135°", as shown in FIG. 1.

An image processing apparatus according to an embodiment of the inventive concept can determines, e.g., the range of the edge direction, to determine whether the edge direction is closer to the horizontal direction of the image or closer to the vertical direction of the image.

In addition, when the edge direction is about 45° or about 135°, or where edges in the image cross each other, an image processing apparatus according to an embodiment of the inventive concept can determine as an exceptional case where it is uncertain whether the edge direction is closer to the horizontal direction of the image or closer to the vertical direction of the image. That is, the result of a first determination according to an embodiment of the inventive concept may include the exceptional case, in addition to the cases of the edge direction being closer to the horizontal direction of the image or being closer to the vertical direction of the image In addition, when the edge is a texture component, the edge may become fuzzy when an interpolation, such as gradient interpolation, is performed on the edge part of the texture component. Further, there may be no edge at the location of the target pixel. Therefore, an image processing apparatus according to an embodiment of the inventive concept may also determine the presence or absence of the edge by using a threshold value, as described below. Thus, the result of a determination according to an embodiment of the inventive concept may include a result of determining whether or not the edge is detected.

More particularly, an image processing apparatus according to an embodiment of the inventive concept can use a filter to detect an edge, such as a high pass filter (HPF), to perform a first determination of the edge direction of each target pixel. In the following, a filter according to an embodiment of an inventive concept may be, e.g., an HPF, but it may also be any filter that can detect an edge.

(1-1-1) First Example of Edge Direction Determination

An image processing apparatus according to an embodiment of the inventive concept performs, for each target pixel, the first determination based on a result of detecting, at the location of the target pixel, an edge closer to the horizontal direction than the vertical direction of the image and a result of detecting, at the location of the target pixel, an edge closer to the vertical direction than the horizontal direction of the image. In the following, the filter that detects an edge closer to the horizontal direction than the vertical direction of the image is referred to as a "first filter", and the filter that detects an edge closer to the vertical direction than the horizontal direction of the image is referred to as a "second filter".

The first filter according to an embodiment of the inventive concept may include, e.g., an HPF as expressed by Equations (3) and (4) below. In this example, "HU" in Equation (3) below is an example of an HPF for detecting a horizontal edge at the upper side of the target pixel and "HD" in Equation (4) below is an example of an HPF for detecting a horizontal edge at the lower side of the target pixel.

$$HU = \frac{1}{8} \cdot \begin{bmatrix} -1 & -2 & -1 \\ 1 & 2 & 1 \\ 0 & 0 & 0 \end{bmatrix}. \tag{3}$$

$$HD = \frac{1}{8} \cdot \begin{bmatrix} 0 & 0 & 0 \\ -1 & -2 & -1 \\ 1 & 2 & 1 \end{bmatrix}. \tag{4}$$

In addition, the second filter according to an embodiment of the inventive concept may include e.g., an HPF as expressed by Equations (5) and (6) below. In this example, "HL" in Equation (5) below is an example of an HPF for detecting a vertical edge at the left side of the target pixel and "HR" in Equation (6) below is an example of an HPF for detecting a vertical edge at the right side of the target pixel.

$$HL = \frac{1}{8} \cdot \begin{bmatrix} -1 & 1 & 0 \\ -2 & 2 & 0 \\ -1 & 1 & 0 \end{bmatrix}. \tag{5}$$

$$HR = \frac{1}{8} \cdot \begin{bmatrix} 0 & -1 & 1 \\ 0 & -2 & 2 \\ 0 & -1 & 1 \end{bmatrix}. \tag{6}$$

An image processing apparatus according to an embodiment of the inventive concept can calculate, e.g., a value using Equation (7) below as a result of the first filter. That is, the result of the first filter at the location of the target pixel is, e.g., the greater of the absolute value of the output of the filter for detecting an horizontal edge of the upper side of the target pixel and the absolute value of the output of the filter for detecting an horizontal edge of the lower side of the target pixel.

$$EH_{i,j} = \max(|fHU_{i,j}|, |fHD_{i,j}|) \tag{7}$$

In addition, an image processing apparatus according to an embodiment of the inventive concept can calculates, e.g., a value using Equation (8) below as a result of the second filter. That is, the result of the second filter at the location of the target pixel is, e.g., the greater of the absolute value of the output of the filter for detecting the vertical edge of the left side of the target pixel and the absolute value of the output of the filter detecting the vertical edge of the right side of the target pixel.

$$EV_{i,j} = \max(|fHL_{i,j}|, |fHR_{i,j}|) \tag{8}$$

An image processing apparatus according to an embodiment of the inventive concept can obtain, as the result of the first determination, a determination result as represented in (A) to (C) below, based on the relationship between the result of the first filter $EH_{i,j}$ calculated by Equation (7) above and the result of the second filter $EV_{i,j}$ calculated by Equation (8) above.

$$EV_{i,j} > EH_{i,j} \quad (A)$$

When $EV_{i,j} > EH_{i,j}$, an image processing apparatus according to an embodiment of the inventive concept determines that the edge direction is closer to the vertical direction of the image at the target pixel.

$$EV_{i,j} < EH_{i,j} \quad (B)$$

When $EV_{i,j} < EH_{i,j}$, an image processing apparatus according to an embodiment of the inventive concept determines that the edge direction is closer to the horizontal direction of the image at the target pixel.

$$EV_{i,j} = EH_{i,j}. \quad (C)$$

The case when $EV_{i,j} = EH_{i,j}$ corresponds to the case where the direction of the edge is about 45° or about 135°, or where edges in the image cross each other. Thus, the case of $EV_{i,j} = EH_{i,j}$, corresponds to the exceptional case where it is uncertain whether the edge direction is closer to the horizontal direction of the image or closer to the vertical direction of the image.

(1-1-2) Second Example of Edge Direction Determination

The first filter according to an embodiment of the inventive concept and the second filter according to an embodiment of the inventive concept are not limited to examples in the section (1-1-1).

For example, when an input image has a region where there are two adjacent horizontal lines with similar luminance values, there is a possibility that the outputs of the first filter and the second filter in section (1-1-1) on that region decrease.

FIGS. 2A and 2B illustrate an image processing method according to an embodiment of the inventive concept and illustrate an example of a region having a similar luminance values on a pair of adjacent horizontal lines in an input image. FIG. 2A illustrates an example of an input image that has a region having a similar luminance values on adjacent horizontal lines, and FIG. 2B conceptually illustrates the input image in FIG. 2A by the luminance magnitude. FIG. 2B illustrates as a "node", a region having a similar luminance values on adjacent horizontal lines.

In this example, an image processing apparatus according to an embodiment of the inventive concept uses, as a first filter according to an embodiment of the inventive concept, a filter that detects a diagonal edge closer to the horizontal direction, in addition to the first filter of section (1-1-1). In addition, an image processing apparatus according to an embodiment of the inventive concept uses, as a second filter according to an embodiment of the inventive concept, a filter that detects a diagonal edge closer to the vertical direction, in addition to the second filter of section (1-1-1).

A filter for detecting a diagonal edge closer to the horizontal direction may, be e.g., an HPF as expressed by Equations (9) and (10) below. In this example, "DU" in Equation (9) below is an example of an HPF that detects a diagonal edge close to the horizontal direction at an upper side of the target pixel, and "DD" in Equation (10) below is an example of an HPF that detects a diagonal edge close to the horizontal direction at a lower side of the target pixel.

$$DU = \frac{1}{4} \cdot \begin{bmatrix} -1 & 0 & 1 \\ 1 & 0 & -1 \\ 0 & 0 & 0 \end{bmatrix}. \quad (9)$$

$$DD = \frac{1}{4} \cdot \begin{bmatrix} 0 & 0 & 0 \\ -1 & 0 & 1 \\ 1 & 0 & -1 \end{bmatrix}. \quad (10)$$

In addition, a filter for detecting a diagonal edge closer to the vertical direction may be, e.g., an HPF as expressed by Equations (11) and (12) below. In this example, "DL" in Equation (11) below is an example of an HPF that detects a diagonal edge close to the vertical direction at the left side of the target pixel, and "DR" in Equation (12) below is an example of an HPF that detects a diagonal edge close to the vertical direction of the right side at the target pixel.

$$DL = \frac{1}{4} \cdot \begin{bmatrix} -1 & 1 & 0 \\ 0 & 0 & 0 \\ 1 & -1 & 0 \end{bmatrix}. \quad (11)$$

$$DR = \frac{1}{4} \cdot \begin{bmatrix} 0 & -1 & 1 \\ 0 & 0 & 0 \\ 0 & 1 & -1 \end{bmatrix}. \quad (12)$$

An image processing apparatus according to an embodiment of the inventive concept can calculate, e.g., a value using Equation (13) below as a result of the first filter. That is, a result of the first filter at the location of the target pixel is the greater of the absolute value of the output of the filter for detecting a horizontal edge at the upper side of the target pixel, the absolute value of the output of the filter for detecting a horizontal edge at the lower side of the target pixel, the absolute value of the output of the filter for detecting a diagonal edge closer to the horizontal direction at the upper side of the target pixel, and the absolute value of the output of the filter for detecting a diagonal edge closer to the horizontal direction at the lower side of the target pixel".

$$EH_{i,j} = \max(|fHL_{i,j}|, |fHR_{i,j}|, |fDL_{i,j}|, |fDR_{i,j}|) \quad (13).$$

In addition, an image processing apparatus according to an embodiment of the inventive concept can calculates, e.g., a value using Equation (14) below as a result of the second filter. That is, a result of the second filter at the location of the target pixel is the greater of the absolute value of the output of the filter for detecting a vertical edge at the left side of the target pixel, the absolute value of the output of the filter for detecting a vertical edge at the right side of the target pixel, the absolute value of the output of the filter for detecting a diagonal edge closer to the vertical direction at the left side of the target pixel, and the absolute value of the output of the filter for detecting a diagonal edge closer to the vertical direction at the right side of the target pixel.

$$EV_{i,j} = \max(|fHU_{i,j}|, |fHD_{i,j}|, |fDU_{i,j}|, |fDD_{i,j}-|) \quad (14).$$

An image processing apparatus according to an embodiment of the inventive concept can perform the same determination as processing according to the first example of section (1-1-1), based on, e.g., the relationship between the result of the first filter $EH_{i,j}$ calculated from Equation (13) above and the result of the second filter $EV_{i,j}$ calculated from Equation (14) above. That is, an image processing apparatus according to an embodiment of the present disclosure can obtain a determination result as represented by cases (A) to (C) obtained when processing the first example in section (1-1-1).

Figure 2:
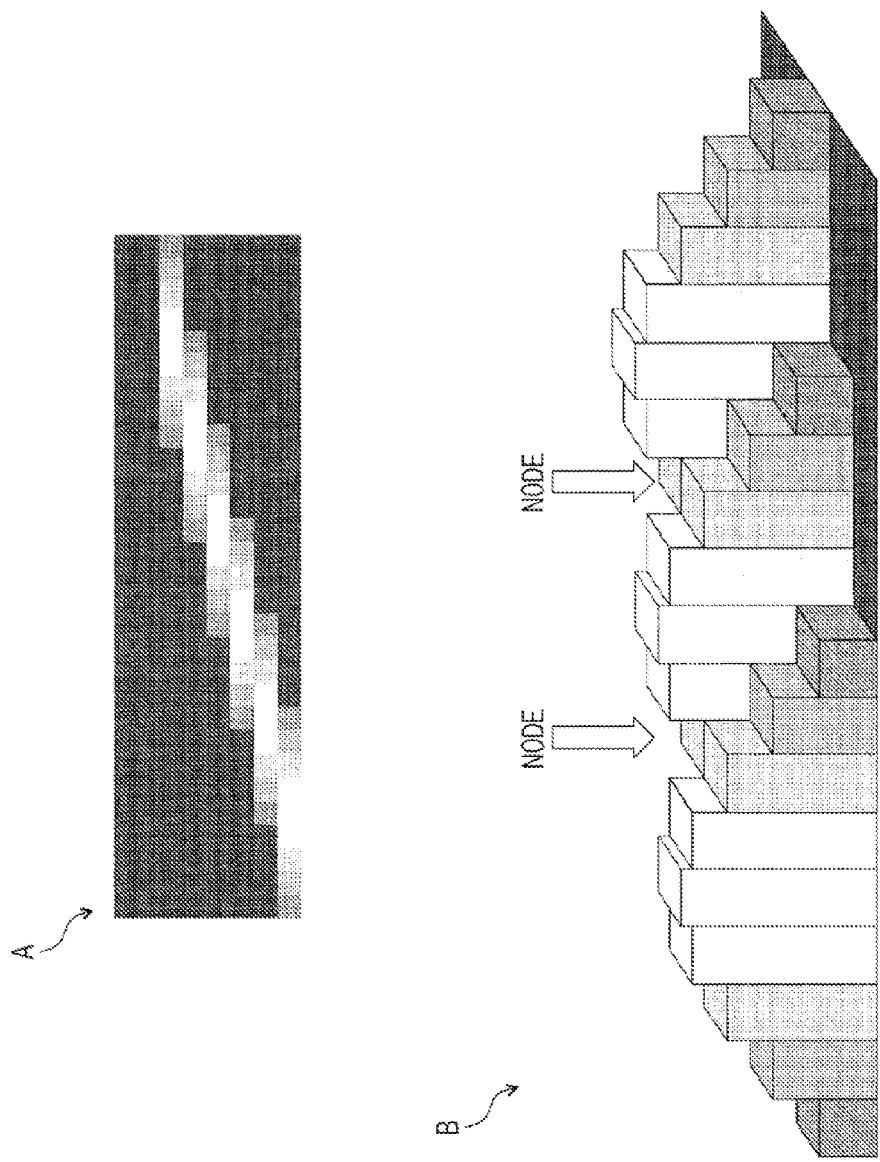
FIG. 2 illustrates an image processing method according to an embodiment of the inventive concept.

In this example, since an image processing apparatus according to an embodiment of the inventive concept uses, as first and second filters, HPFs for detecting a diagonal direction close to the horizontal direction and a diagonal direction close to the vertical direction, the precision of the first determination may be increased, even for a region such as the node in FIG. 2.

(1-1-3) Third Example of Edge Direction Determination

The first and second filters according to embodiments of the inventive concept are not limited to the examples disclosed in sections (1-1-1) and (1-1-2).

For example, an image processing apparatus according to an embodiment of the inventive concept may use an HPF as expressed by Equation 15 below:

$$HL = \frac{1}{18} \cdot \begin{bmatrix} -2 & 2 & 0 \\ -5 & 5 & 0 \\ -2 & 2 & 0 \end{bmatrix}. \quad (15)$$

Further, Equations (3) to (6), (9) to (12) and (15) illustrates coefficients for adjusting a gain, but when there is no change in gain, a determination result does not vary when those coefficients are deleted. Thus, a spatial filter used for an edge direction determination may be implemented by an integer operation, which has a lower operational cost.

Further, an image processing apparatus according to an embodiment of the inventive concept may also process by, e.g., a combination of the first example of section (1-1-1) and the second example of section (1-1-2), i.e., a determination based on the relationship between a value in Equation (7) and a value in Equation (14) or a determination based on the relationship between a value in Equation (8) and a value in Equation (13).

(1-1-4) Fourth Example of Edge Direction Determination

In this example, a small edge may be a texture component, and in many cases, the edge may become fuzzy and blunt when an interpolation, such as gradient interpolation, is performed on the edge part of the texture component. In addition, there may be no edge at the location of the target pixel.

In this example, an image processing apparatus according to an embodiment of the inventive concept can determine the presence or absence of the edge by using a threshold value TE that excludes small edges from the processing according to the first to third examples in sections (1-1-1) to (1-1-3).

In this example, a threshold value TE is obtained experimentally by using an image that includes, e.g., an edge of a texture component. However, in other embodiments of the inventive concept, the threshold value TE may also be determined by any other suitable method.

In particular, an image processing apparatus according to an embodiment of the inventive concept determines that there is no edge, when, e.g., the result value of the first filter $EH_{i,j}$ at the location of the target pixel is less than or equal to the threshold value TE and the result value of the second filter $EV_{i,j}$ at the location of the target pixel is less than or equal to the threshold value TE. Further, an image processing apparatus according to an embodiment of the inventive concept can determines that there is an edge, when, e.g., the result value of the first filter $EH_{i,j}$ is greater than or equal to the threshold value TE and the result value of the second filter $EV_{i,j}$ at the location of the target pixel is greater than or equal to the threshold value TE.

In addition, when it is determined that there is an edge, an image processing apparatus according to an embodiment of the inventive concept can obtain, as a first determination result, a determination result that no edge is detected. In the following, there are cases in which the first determination result is that no edge is detected.

An image processing apparatus according to an embodiment of the inventive concept can process, e.g., according to any of the first to fourth examples of sections (1-1-1) to (1-1-4) to perform a first determination based on an input image.

(1-2) Quadrant Determination (Second Determination)

An image processing apparatus according to an embodiment of the inventive concept can determine, based on the input image, a quadrant to which the edge direction of the target pixel belongs. In this example, the quadrant is a region of an image divided by, e.g., the horizontal direction of the image and the vertical direction of the image. In the following, the determination of the quadrant to which the edge direction belongs may be referred to as a "second determination".

An image processing apparatus according to an embodiment of the inventive concept can determine whether or not the edge direction at the target pixel belongs to the 0-90 quadrant or the 90-180 quadrant in FIG. 1. An image processing apparatus according to an embodiment of the inventive concept can perform the second determination by using, e.g., a differential operator.

In this example, a Sobel filter may be used as the differential operator, which is expressed by Equations (16) and (17) below:

$$GV = \frac{1}{8} \cdot \begin{bmatrix} -1 & 0 & 1 \\ -2 & 0 & 2 \\ -1 & 0 & 1 \end{bmatrix}. \quad (16)$$

$$GH = \frac{1}{8} \cdot \begin{bmatrix} -1 & -2 & -1 \\ 0 & 0 & 0 \\ 1 & 2 & 1 \end{bmatrix}. \quad (17)$$

In this example, a method of determining quadrant to which the edge direction at the target pixel belongs may include, e.g., multiplying of the output result $fGV_{i,j}$ of the filter of Equation (16) above by the output result $fGH_{i,j}$ of the filter of Equation (17) above. In particular, according to a method above, when $fGV_{i,j} \cdot fGH_{i,j} < 0$, it is determined that the edge direction belongs in the 0-90 quadrant and when $fGV_{i,j} \cdot fGH_{i,j} \geq 0$, it is determined that the edge direction belongs in the 90-180 quadrant.

However, a method above may not correctly determine a quadrant at a point where the differential is zero, such as a peak of the edge.

In this example, an image processing apparatus according to an embodiment of the inventive concept can find, e.g., the dominant direction of 3×3 pixel array around the target pixel to determine the quadrant.

An image processing apparatus according to an embodiment of the inventive concept can calculate, e.g., "$P0_{i,j}$" from Equation 18 below and "$P1_{i,j}$" from Equation 19 below and determines a quadrant from the relationship between "$P0_{i,j}$" and "$P1_{i,j}$".

In this example, "$G0_{i,j}$" in Equation (18) is calculated from Equation (20), "$G1_{i,j}$" in Equation (19) is calculated from Equation (21), and "$S_{i,j}$" in Equations (20) and (21) is calculated by Equation 22.

$$P0_{i,j} = \sum_{k=-1}^{1} \sum_{l=-1}^{1} G0_{i+k,j+l}. \tag{18}$$

$$P1_{i,j} = \sum_{k=-1}^{1} \sum_{l=-1}^{1} G1_{i+k,j+l}. \tag{19}$$

$$G0_{i,j} = \begin{cases} 0 & \text{if } S_{i,j} \neq -1 \\ |fGV_{i,j}| + |fGH_{i,j}| & \text{if } S_{i,j} = -1 \end{cases}. \tag{20}$$

$$G1_{i,j} = \begin{cases} 0 & \text{if } S_{i,j} = -1 \\ |fGV_{i,j}| + |fGH_{i,j}| & \text{if } S_{i,j} \neq -1 \end{cases}. \tag{21}$$

$$S_{i,j} = \text{sgn}(fGV_{i,j} \cdot fGH_{i,j}). \tag{22}$$

In particular, an image processing apparatus according to an embodiment of the inventive concept can obtain, as a result of a second determination, a determination as represented in cases (a) to (c) below, based on the relationship between "$P0_{i,j}$" and "$P1_{i,j}$".

$$P0_{i,j} > (\alpha) \cdot P1_{i,j} \tag{a}$$

When $P0_{i,j} > (\alpha) \cdot P1_{i,j}$, an image processing apparatus according to an embodiment of the inventive concept determines that the edge direction belongs in the 0-90 quadrant.

$$P1_{i,j} > (\alpha) \cdot P0_{i,j} \tag{b}$$

When $P1_{i,j} > (\alpha) \cdot P0_{i,j}$, an image processing apparatus according to an embodiment of the inventive concept determines that the edge direction belongs in the 90-180 quadrant.

Neither $P0_{i,j} > (\alpha) \cdot P1_{i,j}$ nor $P1_{i,j} > (\alpha) \cdot P0_{i,j}$ is satisfied (c)

When neither $P0_{i,j} > (\alpha) \cdot P1_{i,j}$ nor $P1_{i,j} > (\alpha) \cdot P0_{i,j}$ is satisfied, an image processing apparatus according to an embodiment of the inventive concept determines that there is no direction, because the correct direction of the edge is uncertain.

In this example, α is a parameter for determining, as no direction, whether the correct direction of the edge is uncertain. The parameter α can be obtained experimentally by using, e.g., a sample image. In addition, according to embodiments of the inventive concept, the parameter α may also be set by any suitable method without limitation to the method above. The parameter α may have a value greater than 1, e.g., 1.5.

An image processing apparatus according to an embodiment of the inventive concept can perform a second determination based on an input image by determining, e.g. a quadrant from the relationship between $P0_{i,j}$ and $P1_{i,j}$ as described above.

In addition, the differential operator used by an image processing apparatus according to an embodiment of the inventive concept is not limited to a filter represented by Equations (16) and (17) above. For example, a differential operator according to an embodiment of the inventive concept may be any suitable differential operator, such as a filter represented by Equation (23) below:

$$GV = \frac{1}{18} \cdot \begin{bmatrix} -2 & 0 & 2 \\ -5 & 0 & 5 \\ -2 & 0 & 2 \end{bmatrix}. \tag{23}$$

(1-3) Calculation Range Determination

An image processing apparatus according to an embodiment of the inventive concept can determine a calculation range by combining an edge direction result of a first determination of section (1-1) and a quadrant determination result of a second determination of section (1-2).

FIG. 3 illustrates an image processing method according to an embodiment of the inventive concept and illustrates an example of a table of results of the first and second determinations, and a calculation range.

The table of FIG. 3 can be implemented by a selector that receives, as an input, e.g., the results of the first determination and the second determination corresponding to the first determination.

In addition, a table according to an embodiment of the inventive concept is not limited thereto. For example, the table of FIG. 3 may be stored in a recording medium included with an image processing apparatus according to an embodiment of the inventive concept, or an external recording medium connected to an image processing apparatus according to an embodiment of the inventive concept, and may also be appropriately accessed by an image processing apparatus according to an embodiment of the inventive concept.

In this example, in the table of FIG. 3, a calculation range of "no direction" corresponds to when a detection of an edge direction was not performed.

An image processing apparatus according to an embodiment of the inventive concept can determines a calculation range based on a combination of the result of first determination and the result of second determination by referencing, e.g., the table represented in FIG. 3.

In this example, when the edge direction is the angle as shown in FIG. 1, 180° corresponds to 0°. In addition, when the edge direction determined by an image processing method according to an embodiment of the inventive concept is used for interpolation, 0° and 90° have the same meaning in that there is no diagonal interpolation. Thus, in a calculation range determination according to an embodiment of the inventive concept, e.g., 0° (180°) and 90° are included in the calculation range, as shown in FIG. 3.

In addition, a calculation range determination according to an embodiment of the inventive concept is not limited thereto, and an image processing apparatus according to an embodiment of the inventive concept may determine a calculation range by any suitable method that can determine a calculation range by combining the result of first determination and the result of second determination.

An image processing apparatus according to an embodiment of the inventive concept can performs, as a preprocessing of section (1), an edge direction determination of section (1-1), a quadrant determination of section (1-2), and a calculation range determination of section (1-3) and based on an input image.

For convenience, the preprocessing of section (1) is divided into the edge direction determination of section (1-1), the quadrant determination of section (1-2), and the calculation range determination of section (1-3). Thus, the processing of section (1) can perform, e.g., the edge direction determination of section (1-1), the quadrant determination of section (1-2), and the calculation range determination of section (1-3) as a single process. Further, the preprocessing of section (1) may also perform, e.g., the edge direction determination of section (1-1), the quadrant determination of section (1-2), and the calculation range determination of section (1-3), as two or more processes, by any method of dividing the processes.

(2) Edge Direction Detection

An image processing apparatus according to an embodiment of the inventive concept can performs a calculation within the calculation range determined by the preprocessing of section (1) based on an input image to detect the edge direction.

An image processing apparatus according to an embodiment of the inventive concept can perform, e.g., a calculation based on block matching within the calculation range determined by the preprocessing of section (1) to detect the edge direction.

In this example, since an image processing apparatus according to an embodiment of the inventive concept can perform an edge direction detection of section (2) within the calculation range determined by the preprocessing of section (1), fewer operations are used as compared with matching in all directions.

In addition, an image processing apparatus according to an embodiment of the inventive concept can more precisely detect the edge direction, when block matching is used to detect edge direction in section (2). Thus, in an edge direction detection of section (2), detection precision of the edge direction does not decrease, and since the possibility of an incorrect edge direction detection is minimized by the process of section (2), a more reliable edge direction is obtained.

Thus, an image processing method according to an embodiment of the inventive concept can more precisely detect an edge direction, which can decrease operating cost when detecting an edge direction.

Also, since an image processing apparatus according to an embodiment of the inventive concept may detect an edge direction for each pixel of an input image, a jagged diagonal is smoothed using a gradient interpolation based on the jagged direction, e.g., when the edge direction detected by an image processing apparatus according to an embodiment of the inventive concept is magnified. In this example, the processing to decrease jaggedness may be performed by an image processing apparatus according to an embodiment of the inventive concept or by a device external to an image processing apparatus according to an embodiment of the inventive concept.

II. Image Processing Apparatus According to Embodiment of Inventive Concept

Hereinbelow is described an example of a configuration of an image processing apparatus according to an embodiment of the inventive concept that may perform processing according to an image processing method according to an embodiment of the inventive concept as described above. In the following, an example of a configuration of an image processing apparatus according to an embodiment of the inventive concept is directed to a case in which an edge direction in an edge direction detection of section (2) is detected by block matching.

Figure 4:
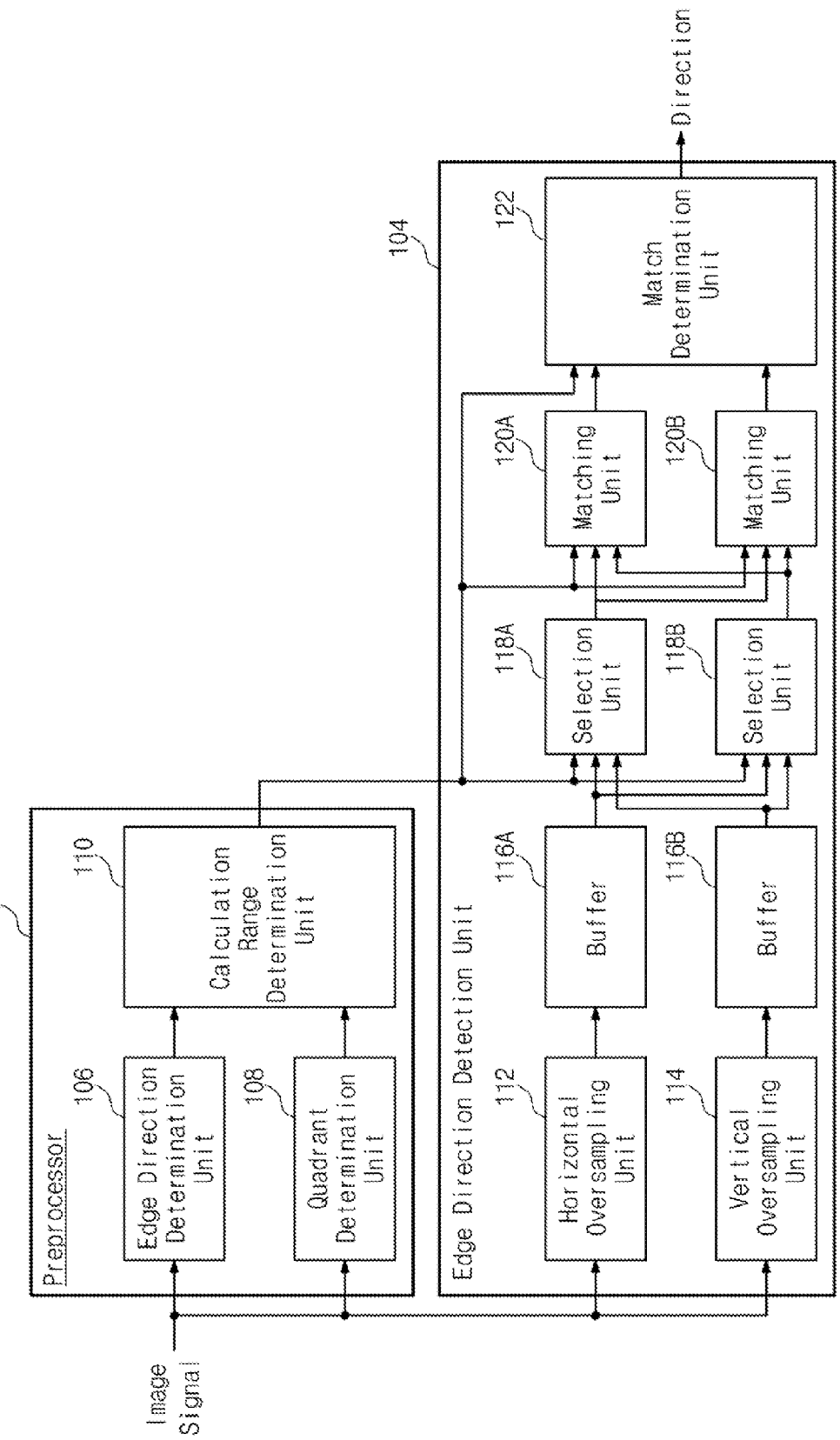
FIG. 4 is a block diagram of an example of a configuration of an image processing apparatus according to an embodiment of the inventive concept.

FIG. 4 is a block diagram of an example of a configuration of an image processing apparatus 100 according to an embodiment of the inventive concept.

The image processing apparatus 100 includes, e.g., a preprocessor 102 and an edge direction detection unit 104.

In addition, the image processing apparatus 100 includes, e.g., a processor, such as a central processing unit (CPU), or other processing circuits and may also include a control unit that controls the image processing apparatus 100. When a control unit is included, the control unit in the image processing apparatus 100 may function as the preprocessor 102 or the edge direction detection unit 104.

In addition, it is to be understood that any or both of the preprocessor 102 and the edge direction detection 104 may be implemented in one or more processing circuits separate from the control unit. In addition, the processing of one or both of the preprocessor 102 and the edge direction detection unit 104 may also be implemented by a software program that is executed on a processor.

The preprocessor 102 can perform the preprocessing of section (1), and can determine a calculation range based on an input image. The preprocessor 102 can determine the calculation range based on a result of a first determination from the edge direction determination of section (1-1), and a result of a second determination corresponding to the first determination from the quadrant determination of section (1-2).

The preprocessor 102 includes, e.g., an edge direction determination unit 106, a quadrant determination unit 108, and a calculation range determination unit 110.

The edge direction determination unit 106 can perform an edge direction determination of section (1-1) and the first determination based on an input image. The edge direction determination unit 106 performs, e.g., any of the processes according to the first to fourth examples of sections (1-1-1) to (1-1-4).

The quadrant determination unit 108 can perform a quadrant determination of section (1-2) and the second determination based on the input image. The quadrant determination unit 108 performs the second determination by using, e.g., a differential operator.

The calculation range determination unit 110 can perform a calculation range determination of section (1-3) and can determine a calculation range by combining the results of the first and second determinations. The calculation range determination unit 110 can determine the calculation range from the combination of the results of the first and second determinations by referencing, e.g., the table of FIG. 3.

In addition, the calculation range determination unit 110 transmits, e.g., information that represents the determined calculation range for each target pixel to the edge direction detection unit 104.

The preprocessor 102 includes, e.g., the edge direction determination unit 106, the quadrant determination unit 108, and the calculation range determination unit 110 as described above, and thus determines a calculation range based on the input image.

However, a configuration of the preprocessor 102 is not limited to the configuration in FIG. 4.

For convenience, the preprocessing of section (1) may be divided into, e.g., the edge direction determination of section (1-1), the quadrant determination of section (1-2), and the calculation range determination of section (1-3), as described above. Thus, the configuration of the preprocessor 102 for implementing the preprocessing of section (1) is not limited to the edge direction determination unit 106, the quadrant determination unit 108, and the calculation range determination unit 110 in FIG. 4, and may have other configurations based on a division of the preprocessing of section (1).

The edge direction detection unit 104 can perform an edge direction detection of section (2) and can perform a calculation within the calculation range determined by the preprocessing unit 102 based on the input image to detect the direction of the edge.

The edge direction detection unit 104 includes, e.g., a horizontal oversampling unit 112, a vertical oversampling unit 114, buffers 116A and 116B, selectors (118A and 118B), matching units 120A and 120B, and a match determination unit 122.

The horizontal oversampling unit 112 horizontally oversamples an input image, and the vertical oversampling unit 114 vertically oversamples the input image.

In this example, when an angle is found by matching, only an approximate angle may be obtained because of limitations associated obtaining an angle by connecting a target pixel and a pixel on a line adjacent to the target pixel. Therefore, the edge direction detection unit 104 increases a detection angle by oversampling the input image.

The horizontal oversampling unit 112 can horizontally oversample the input image by performing, e.g., linear interpolation, and obtaining an interpolation value. In addition, the vertical oversampling unit 114 can vertically oversample the input image by performing, e.g., linear interpolation, and obtaining an interpolation value. However, the processes of the horizontal and vertical oversampling units 112 and 114 are not limited thereto, and each of the horizontal and vertical oversampling units 112 and 114 may perform according to any interpolation method.

In particular, each of the horizontal and vertical oversampling units 112 and 114 independently operates horizontally and vertically and, e.g., oversamples by two times. A horizontal oversampling pixel value $x_{i,j+0.5}$ in the middle between pixels (i,j) and (i, j+1) is calculated by, e.g. Equation (24) below. A vertical oversampling pixel value $xi_{+0.5,j}$ in the middle between pixels (i+1,j) and (i, j) is calculated by, e.g. Equation (25) below.

$$x_{i,j+0.5} = \frac{x_{i,j} + x_{i,j+1}}{2}. \quad (24)$$

$$x_{i+0.5,j} = \frac{x_{i,j} + x_{i+1,j}}{2}. \quad (25)$$

Figure 5A:
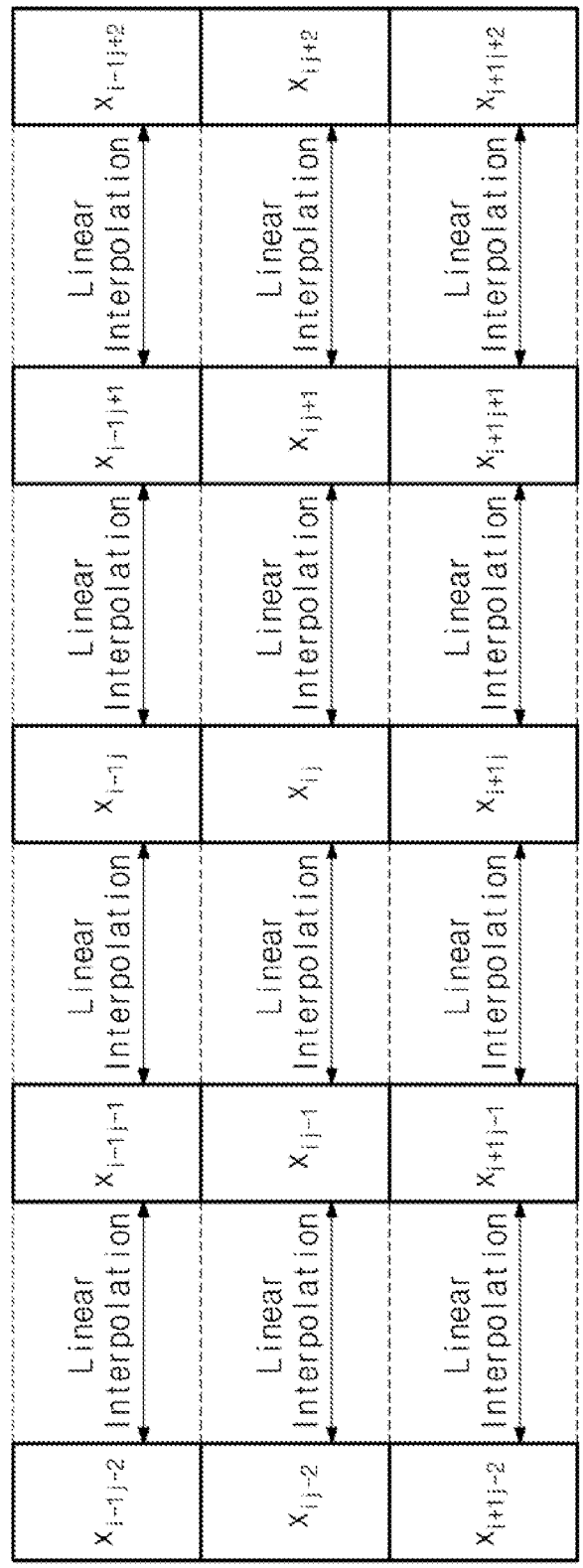
FIGS. 5A and 5B illustrate examples of processing by an image processing apparatus according to an embodiment of the inventive concept.
Figure 5B:
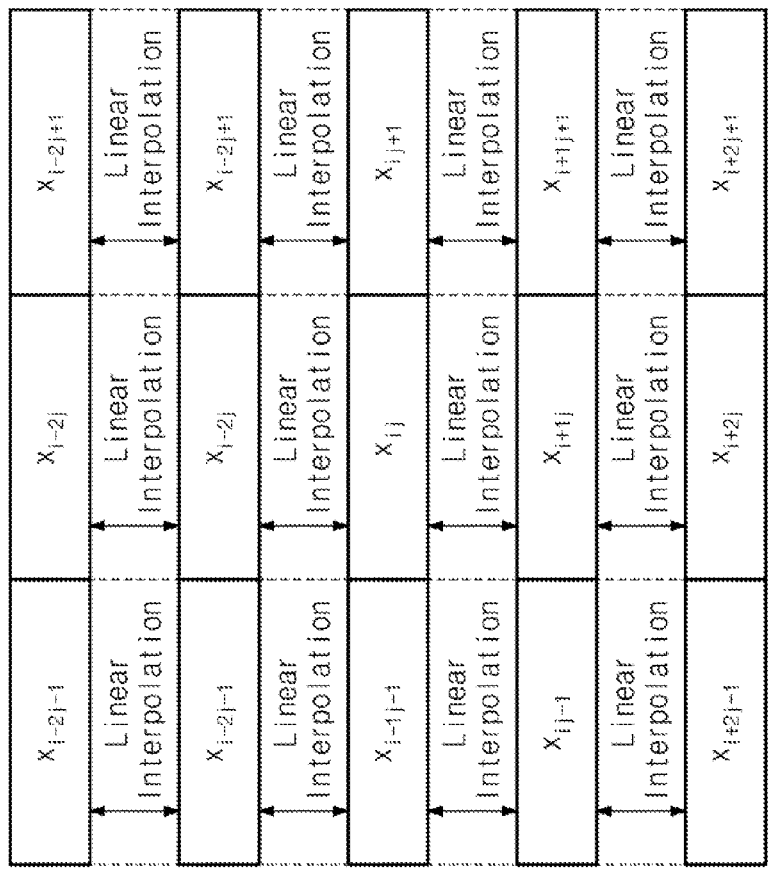

FIGS. 5A and 5B illustrate examples of processing by an image processing apparatus according to an embodiment of the inventive concept. FIG. 5A illustrates an example of horizontal two-time oversampling by the horizontal oversampling unit 112, and FIG. 5B illustrates an example of vertical two-time oversampling by the vertical oversampling unit 114.

For example, the horizontal oversample value of a target pixel and a row line adjacent to the upper or lower side of the target pixel in FIG. 5A is used to find the angle of an edge close to a horizontal direction, except at 0° and 90°. In addition, the vertical oversample value of a target pixel and a column line adjacent to the left or right side of the target pixel in FIG. 5B is used to find the angle of an edge close to a vertical direction, except at 0° and 90°.

The buffer 116A maintains a processing result from the horizontal oversampling unit 112 and the buffer 116B maintains a processing result from the vertical oversampling unit 114.

The selection units 118A and 118B select data from the buffers 116A and 116B to match a compressed calculation range based on a calculation range for each target pixel received from the preprocessor 102, and transmits the selected data to the matching units 120A and 120B.

In this example, the selection unit 118A transmits to the matching units 120A and 120B data to match the upper side or left side of the target pixel, and the selection unit 118B transmits to the matching units 120A and 120B data to match the lower side or right side of the target pixel. In addition, it is to be understood that combinations of data transmitted to the matching units 120A and 120B by the selection units 118A and 118B are not limited to the example above.

In addition, when information representing the calculation range corresponds to the exceptions, the selection units 118A and 118B transmit matching data to the matching units 120A and 120B so that the matching units 120A and 120B can perform an operation for any one of the horizontal and vertical directions for 45° and 135°. When calculation range information corresponds to the exceptions, the selection units 118A and 118B transmit to the matching units 120A and 120B, e.g., data corresponding to three points that include 0° and 90°, as shown in FIG. 3.

The matching units 120A and 120B uses data received from the selection units 118A and 118B to perform matching.

Figure 7:
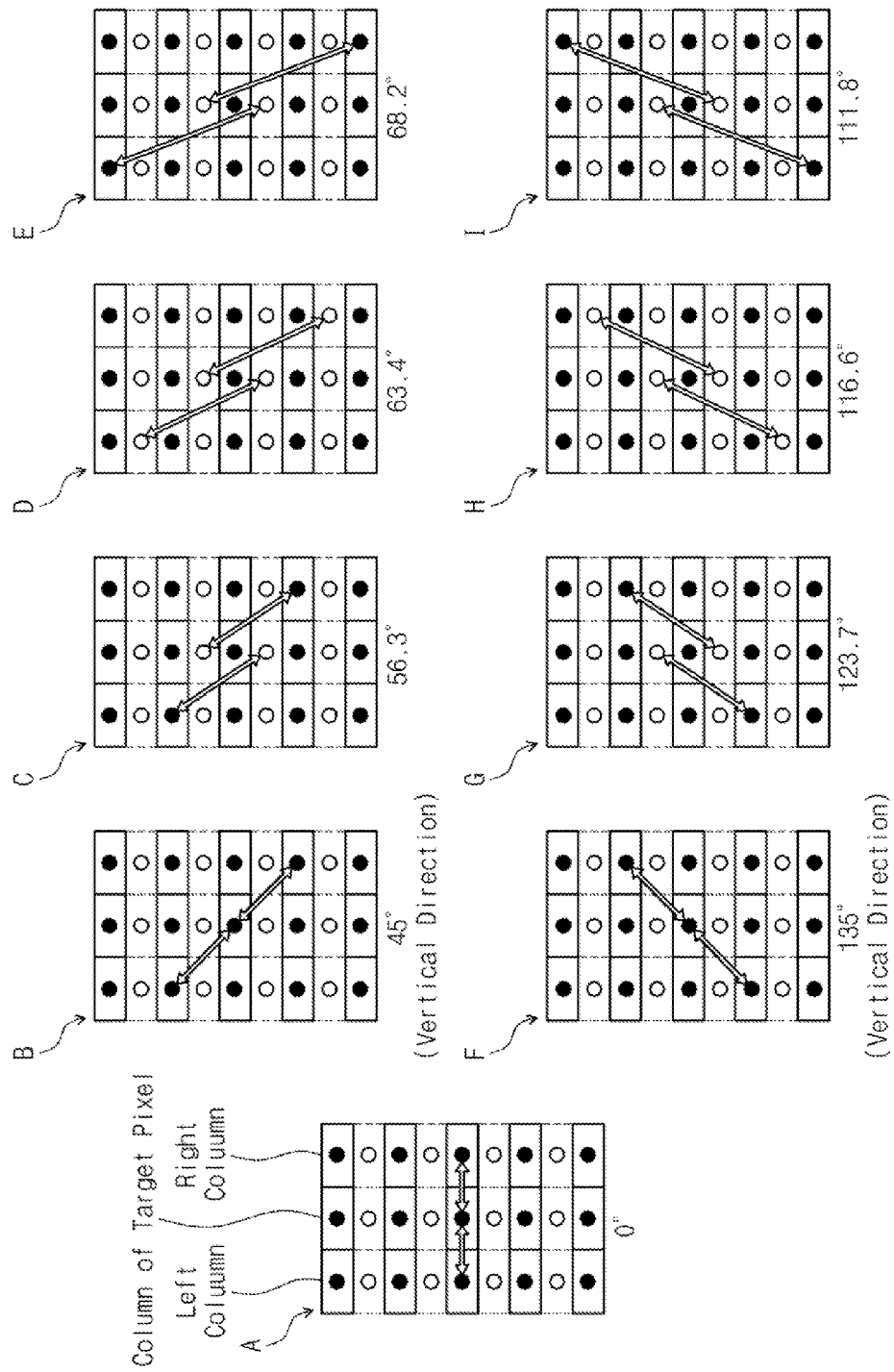
FIG. 7 illustrates an example of processing by a matching unit in an image processing apparatus according to an embodiment of the inventive concept.

FIGS. 6 and 7 illustrate examples of processing by the matching units 120A and 120B, and illustrate examples of matching locations. The mark "●" in FIGS. 6 and 7 represents an original pixel of an input image, and the mark "○" in FIGS. 6 and 7 represent an interpolation pixel. In addition, A to I of FIG. 6 and A to I of FIG. 7 illustrate the location relationship between adjacent pixels based on the angle. Further, since using a line passing a point near an interpolation target pixel is effective, there are cases where arrows are dislocated from target pixels in FIGS. 6 and 7.

In matching, a match value may be, e.g., an absolute value of a difference between pixel values of pixels connected by arrows, or a sum of absolute values of the differences between pixel values of a plurality of adjacent pixels. When a plurality of pixels is used, a thinned-out pixel, which is a pixel thinned out from among adjacent pixels within in a range satisfying a sampling theorem for interpolation, may be used within a range satisfying a sampling theorem.

Figure 8A:
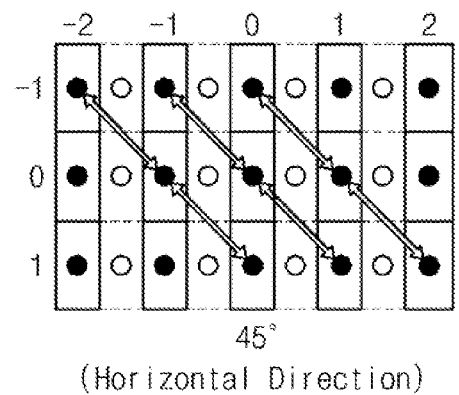
FIGS. 8A and 8B illustrate examples of processing by a matching unit in an image processing apparatus according to an embodiment of the inventive concept.
Figure 8B:
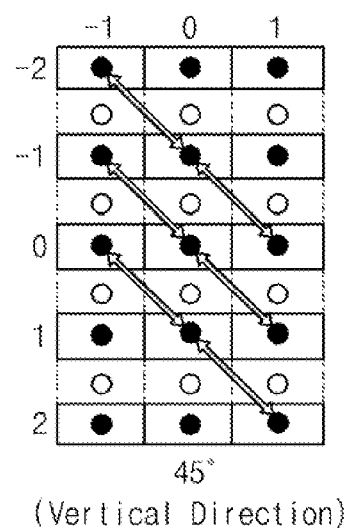

FIGS. 8A and 8B illustrate examples of processing performed by the matching units 120A and according to an embodiment of the inventive concept, and illustrate calculation examples of match value at 45° using three thinning-out points.

For example, a match value $JU45_{i,j}$ for a row line adjacent to an upper side of a target pixel, a match value $JD45_{i,j}$ for a row line adjacent to a lower side of a target pixel, a match value $JL45_{i,j}$ for a column line adjacent to a left side of a target pixel, and a match value $JR45_{i,j}$ for a column line adjacent to a right side of a target pixel can be calculated as, e.g., sums of absolute values of the differences in Equation (26) below:

$$\begin{cases} JU45_{i,j} = \sum_{k=-1}^{1} |x_{i,j+k} - x_{i-1,j+k-1}| \\ JD45_{i,j} = \sum_{k=-1}^{1} |x_{i,j+k} - x_{i+1,j+k+1}| \\ JL45_{i,j} = \sum_{k=-1}^{1} |x_{i+k,j} - x_{i+k-1,j-1}| \\ JR45_{i,j} = \sum_{k=-1}^{1} |x_{i+k,j} - x_{i+k+1,j+1}| \end{cases} \quad (26)$$

In this example, the match values calculated from Equation (26) above are calculated using sums of absolute difference (SAD). In addition, an image processing apparatus 100 may perform one or more additional operations on the pixel values used above and then use the resulting values in calculating the match value.

The matching units 120A and 120B calculate a match value for each angle in FIG. 6 or 7 in the same way as the calculation example as described for FIG. 8.

In addition, the matching units 120A and 120B may use a wider reference range than the examples in FIG. 6 or 7 to calculate a match value at a narrower angle, or may select some detection angles in the examples of FIG. 6 or 7 to calculate match values for them.

The matching units 120A and 120B calculate a match value for each discrete angle within the calculation range compressed by the preprocessor 102, and outputs, as a detection value, a minimum angle of the match value.

In this example, the matching unit 120A matches, e.g., the upper side of a target pixel in a horizontal direction and the left side of the target pixel in a vertical direction. In addition, the matching unit 120B matches, e.g., the lower side of the target pixel in the horizontal direction and the right side of the target pixel in the vertical direction. However, it is to be understood that examples of operations performed by the matching units 120A and 120B are not limited to those disclosed above.

The match determination unit 122 detects the edge direction based on, e.g., one or both of calculation ranges received from the preprocessor 102 that correspond to each target pixel and a detection value received from each of the matching units 120A and 120B.

By using detection values received from each of the matching units 120A and 120B, the match determination unit 122 obtains two independent direction detection results from the upper and lower sides or left and right sides of the target pixel. In the case of a diagonal line, the two independent direction detection results should represent a coincident direction, and since the matching units 120A and 120B operate on a discrete angle, the two independent direction detection results would be used by one-direction unit even if they are dislocated.

For example, if the matching unit 120A outputs 26.6° as the detection value in FIG. 6, it may be said that a correct angle is obtained from the matching units 120A and 120B if the matching unit 120B outputs in the range of about 21.8° to about 33.7° in FIG. 7.

In addition, if the matching unit 120A outputs 26.6° as the detection value in FIG. 6, a correct angle is not obtained from the matching units 120A and 120B if the matching unit 120B outputs 45° in FIG. 7, which is an example of dislocation of two or more direction units. In this case, processing is completed with the determination that no direction was detected, without performing a gradient interpolation adapted to the direction of the edge. Also, since interpolating between pixels more distant from the location of the target pixel means the angle is closer to 0° or 90°, a gradient interpolation error result when a matching angle is not appropriate becomes larger when a wrong angle is detected.

In this example, the match determination unit 122 detects the direction of the edge as shown in, e.g., (i) to (iv) below.

(i) When an angle corresponding to the detection value of matching unit 120A completely matches an angle corresponding to the detection value of matching unit 120B:

The match determination unit 122 determines the edge direction to be the direction corresponding to the match angle.

(ii) When there is a one-direction unit mismatch between the angle corresponding to the detection value of the matching unit 120A and the angle corresponding to the detection value of the matching unit 120B:

The match determination unit 122 determines the edge direction to be any one of the angle corresponding to the detection value of the matching unit 120A and the angle corresponding to the detection value of the matching unit 120B.

For example, the match determination unit 122 may determine a direction corresponding to an angle closer to 90°, as the result of detecting an edge direction, in the case of a horizontal direction, and a direction corresponding to an angle closer to 0°, as the result of detecting an edge direction, in the case of a vertical direction. That is, the match determination unit 122 determines, as the result of detecting an edge direction, a direction corresponding to the angle of a side having a shorter gradient interpolation distance when interpolation adapted to the direction of the edge is performed.

(iii) When a calculation range received from the preprocessor 102 represents exceptions:

When a calculation range received from the preprocessor 102 represents exceptions, the match determination unit 122 determines an edge direction to be a direction that corresponds to a match angle only if, e.g., the angle corresponding to the detection value of the matching unit 120A and the angle corresponding to the detection value of the matching unit 120B match as 45° or 135°. In addition, the match determination unit 122 determines that the edge has no direction, as the detection result, e.g., if the angle corresponding to the detection value of the matching unit 120A and the angle corresponding to the detection value of the matching unit 120B do not match as 45° or 135°

(iii) When a calculation range received from the preprocessor 102 does not represent a direction:

When a calculation range received from the preprocessor 102 does not represent a direction, the match determination unit 122 determines that an edge does not exist, i.e. has no direction, as the edge direction detection result.

When the edge direction is detected, the match determination unit 122 outputs information representing the detection result. The information representing the detection result may include, e.g., data representing an angle or data for not processing using the edge direction, such as data representing no direction. The information representing the detection result may also be, e.g., data for each target pixel or group of input image based data.

In this example, the output detection result is transmitted to an image processing unit included with the image processing apparatus 100 that performs processing based on the direction of the edge, such as interpolation adapted to the direction of the edge. In addition, the detection result may also be stored in a recording medium or transmitted to an external device of the image processing apparatus through, for example, a communication device. The storing of the detection result into the recording medium or the transmission of the detection result through the communication device can be controlled by, e.g., a control unit.

The edge direction detection unit 104 includes, e.g., the horizontal oversampling unit 112, the vertical oversampling unit 114, the buffers 116A and 116B, the selection units 118A and 118B, the matching units 120A and 120B, and the match determination unit 122 as described above, and thus calculates within a calculation range determined by the preprocessor 102 based on an input image to detect edge direction.

In addition, the configuration of the edge direction detection unit 104 is not limited to the configuration in FIG. 4. For example, although FIG. 4 shows an example of a configuration when the edge direction detection unit 104 performs a block matching calculation within the calculation range determined by the preprocessor 102, the edge direction detection unit 104 may have a configuration according to any edge direction detection method within the calculation range determined by the preprocessor 102.

The image processing apparatus 100 according to an embodiment of the inventive concept performs preprocessing of section (1) and edge direction detection of section (2) according to an image processing method according to an embodiment of the inventive concept, by the configuration, including variations thereof, in e.g., FIG. 4.

Thus, the image processing apparatus 100 may enhance edge direction detection precision, thus decreasing an operating cost for edge direction detection.

Although an image processing apparatus has been described above in an embodiment of the inventive concept, embodiments of the inventive concept are not limited thereto. Embodiments of the inventive concept may be applied to many devices that process images, such as a computer, including a personal computer or a server, a tablet-type device, and a communication device such as a mobile phone or smart phone. In addition, embodiments of the inventive concept may also be applied to one or more integrated circuits (IC).

III. Program According to Embodiment of Inventive Concept

A program for enabling a computer to function as an image processing apparatus according to an embodiment of the inventive concept, such as a program that enables a computer to function as a preprocessor corresponding to the preprocessor 102 and an edge direction detector corresponding to the edge direction detection unit 104, may be executed on a computer to enhance edge direction detection precision, decreasing an operating cost for edge direction detection.

In addition, a program enabling a computer to function as an image processing apparatus according to an embodiment of the inventive concept can be executed on the computer, which has a same effect as when an image processing apparatus according to an embodiment of the inventive as described above is used.

In addition, although exemplary embodiments of the inventive concept have been described with reference to the accompanying drawings, embodiments of the inventive concept are not limited thereto. A person skilled in the art may clearly appreciate that it is possible to envisage many changes and modifications within the scope of the following claims, and it is construed that they also fall within the technical scope of embodiments of the present disclosure.

For example, it has been described that a program has been provided that enables a computer to function as an image processing apparatus according to an embodiment of the inventive concept, but embodiments of the inventive concept may also provide a recording medium that stores the program.

According to embodiments of the inventive concept, edge direction detection precision may be enhanced, decreasing an operating cost for edge direction detection.

The above-disclosed subject matter is to be considered illustrative and not restrictive, and the appended claims are intended to cover all such modifications, enhancements, and other embodiments, which fall within the true spirit and scope of embodiments of the inventive concept. Thus, to the maximum extent allowed by law, the scope of the embodiments of inventive concept are to be determined by the broadest permissible interpretation of the following claims and their equivalents, and shall not be restricted or limited by the foregoing detailed description.

What is claimed is:

1. An image processing apparatus comprising:
   a preprocessor that determines, based on an input image, a calculation range of a calculation which detects an edge direction in the input image; and
   an edge direction detection unit that performs the calculation within the calculation range determined based on the input image to detect the edge direction,
   wherein the preprocessor determines the calculation range based on a result of a first determination that determines whether the edge direction is closer to a horizontal direction of the input image or closer to a vertical direction of the input image, and a result of a second determination that determines a quadrant to which the edge direction belongs.

2. The image processing apparatus of claim 1, wherein the preprocessor comprises:
   an edge direction determination unit that performs the first determination based on the input image;
   a quadrant determination unit that performs the second determination based on the input image; and
   a calculation range determination unit that determines the calculation range based on the result of the first determination and the result of the second determination.

3. The image processing apparatus of claim 2, wherein the edge direction determination unit performs the first determination on each target pixel based on a result of a first filter that detects whether an edge at the each target pixel is closer to a horizontal direction than a vertical direction of an image, and a result of a second filter that detects whether an edge at the each target pixel is closer to the vertical direction than the horizontal direction of an image.

4. The image processing apparatus of claim 3, wherein the result of the first filter at the location of the each target pixel is a greater of an absolute value of an output of a filter that detects a horizontal edge at a upper side of the each target pixel and an absolute value of an output of a filter that detects a horizontal edge at a lower side of the each target pixel.

5. The image processing apparatus of claim 3, wherein the result of the first filter at the location of the each target pixel is a greatest of an absolute value of an output of a filter that detects a horizontal edge at an upper side of the each target pixel, an absolute value of an output of a filter that detects a horizontal edge at a lower side of the each target pixel, an absolute value of an output of a filter that detects a diagonal edge closer to the horizontal direction than the vertical direction at the upper side of the each target pixel, and an absolute value of an output of a filter that detects a diagonal edge closer to the horizontal direction than the vertical direction at the lower side of the each target pixel.

6. The image processing apparatus of claim 3, wherein the result of the second filter at the location of the each target pixel is a greater of an absolute value of an output of a filter that detects a vertical edge at a left side of the each target pixel and an absolute value of an output of a filter that detects a vertical edge at a right side of the each target pixel.

7. The image processing apparatus of claim 3, wherein the result of the second filter at the location of the each target pixel is a greatest of an absolute value of an output of a filter that detects a vertical edge at a left side of the each target pixel, an absolute value of an output of a filter that detects a vertical edge at a right side of the each target pixel, an absolute value of an output of a filter that detects a diagonal edge closer to the vertical direction than the horizontal direction at the left side of the each target pixel, and an absolute value of an output of a filter that detects a diagonal edge closer to the vertical direction than the horizontal direction at the right side of the each target pixel.

8. The image processing apparatus of claim 3, wherein the edge direction determination unit determines that there is no edge when the result of the first filter at the location of the each target pixel is less than or equal to a predetermined threshold value and the result of the second filter at the location of the each target pixel is less than or equal to the threshold value.

9. The image processing apparatus of claim 3, wherein the quadrant determination unit uses a differential operator to perform the second determination.

10. An image processing method comprising:
   determining a calculation range of a calculation that detects an edge direction in an input image; and
   performing the calculation within the calculation range to detect the edge direction,
   wherein determining a calculation range comprises determining whether the edge direction in the input image is closer to a horizontal direction of the input image or closer to a vertical direction of the input image, determining a quadrant to which the edge direction belongs, and determining the calculation range based on the edge direction and the quadrant to which the edge direction belongs.

11. The image processing method of claim 10, wherein determining whether the edge direction in the input image is closer to a horizontal direction of the input image or closer to a vertical direction of the input image comprises detecting, with a first filter, whether an edge at a target pixel is closer to a horizontal direction than a vertical direction of an image, and detecting, with a second filter, whether an edge at the target pixel is closer to the vertical direction than the horizontal direction of an image.

12. The image processing method of claim 11, wherein a result of the first filter at the location of the target pixel is a greater of an absolute value of an output of a filter that detects a horizontal edge at a upper side of the target pixel and an absolute value of an output of a filter that detects a horizontal edge at a lower side of the target pixel.

13. The image processing method of claim 11, wherein the result of the first filter at the location of the target pixel is a greatest of an absolute value of an output of a filter that detects a horizontal edge at an upper side of the target pixel, an absolute value of an output of a filter that detects a horizontal edge at a lower side of the target pixel, an absolute value of an output of a filter that detects a diagonal edge closer to the horizontal direction than the vertical direction at the upper side of the target pixel, and an absolute value of an output of a filter that detects a diagonal edge closer to the horizontal direction than the vertical direction at the lower side of the target pixel.

14. The image processing method of claim 11, wherein the result of the second filter at the location of the target pixel is a greater of an absolute value of an output of a filter that detects a vertical edge at a left side of the target pixel and an absolute value of an output of a filter that detects a vertical edge at a right side of the target pixel.

15. The image processing method of claim 11, wherein the result of the second filter at the location of the target pixel is a greatest of an absolute value of an output of a filter that detects a vertical edge at a left side of the target pixel, an absolute value of an output of a filter that detects a vertical edge at a right side of the target pixel, an absolute value of an output of a filter that detects a diagonal edge closer to the vertical direction than the horizontal direction at the left side of the target pixel, and an absolute value of an output of a filter that detects a diagonal edge closer to the vertical direction than the horizontal direction at the right side of the target pixel.

16. The image processing method of claim 11, further comprising determining that there is no edge when the result of the first filter at the location of the target pixel is less than or equal to a predetermined threshold value and the result of the second filter at the location of the target pixel is less than or equal to the threshold value.

17. The image processing method of claim 10, wherein determining a quadrant to which the edge direction belongs comprises:
   calculating a result fGV of a first differential filter at the location of a target pixel;
   calculating a result fGH of a second differential filter at the location of the target pixel;
   calculating a first sum $P0=\Sigma_{k=-1}^{1}\Sigma_{l=-1}^{1}G0_{k,l}$ and a second sum $P1=\Sigma_{k=-1}^{1}\Sigma_{l=-1}^{1}G1_{k,l}$, wherein $$G0 = \begin{cases} 0 & \text{if } S \neq -1 \\ |fGV|+|fGH| & \text{if } S = -1 \end{cases},$$

$$G1 = \begin{cases} 0 & \text{if } S = -1 \\ |fGV|+|fGH| & \text{if } S \neq -1 \end{cases}, \text{ and}$$

$$S = \text{sgn}(fGV \times fGH);$$

determining that the edge direction belongs to a 0° to 90° quadrant if P0>αP1;
   determining that the edge direction belongs to a 90° to 180° quadrant if P1>αP0; and
   determining that the edge direction is uncertain, if neither $P0_j > \alpha \cdot P1_j$ nor $P1_j > \alpha \cdot P0_j$ is satisfied,
   wherein α is a parameter experimentally obtained from a sample image.

18. An image processing apparatus comprising:
   a preprocessor that determines, based on an input image, a calculation range of a calculation which detects an edge direction in the input image,
   wherein the preprocessor determines the calculation range based on a result of a first determination that determines whether the edge direction is closer to a horizontal direction of the input image or closer to a vertical direction of the input image and a result of a second determination that determines a quadrant to which the edge direction belongs,
   wherein the preprocessor comprises:
   an edge direction determination unit that performs the first determination based on the input image;
   a quadrant determination unit that performs the second determination based on the input image; and
   a calculation range determination unit that determines the calculation range based on the result of the first determination and the result of the second determination.

19. The image processing apparatus of claim 18, further comprising an edge direction detection unit that performs the calculation within the calculation range determined based on the input image to detect the edge direction.

20. The image processing apparatus of claim 18, wherein the edge direction determination unit performs the first determination on each target pixel based on a result of a first filter that detects whether an edge at the each target pixel is closer to a horizontal direction than a vertical direction of an image, and a result of a second filter that detects whether an edge at the each target pixel is closer to the vertical direction than the horizontal direction of an image.

* * * * *